2,846,035
AUTOMATIC SPEED CONTROL

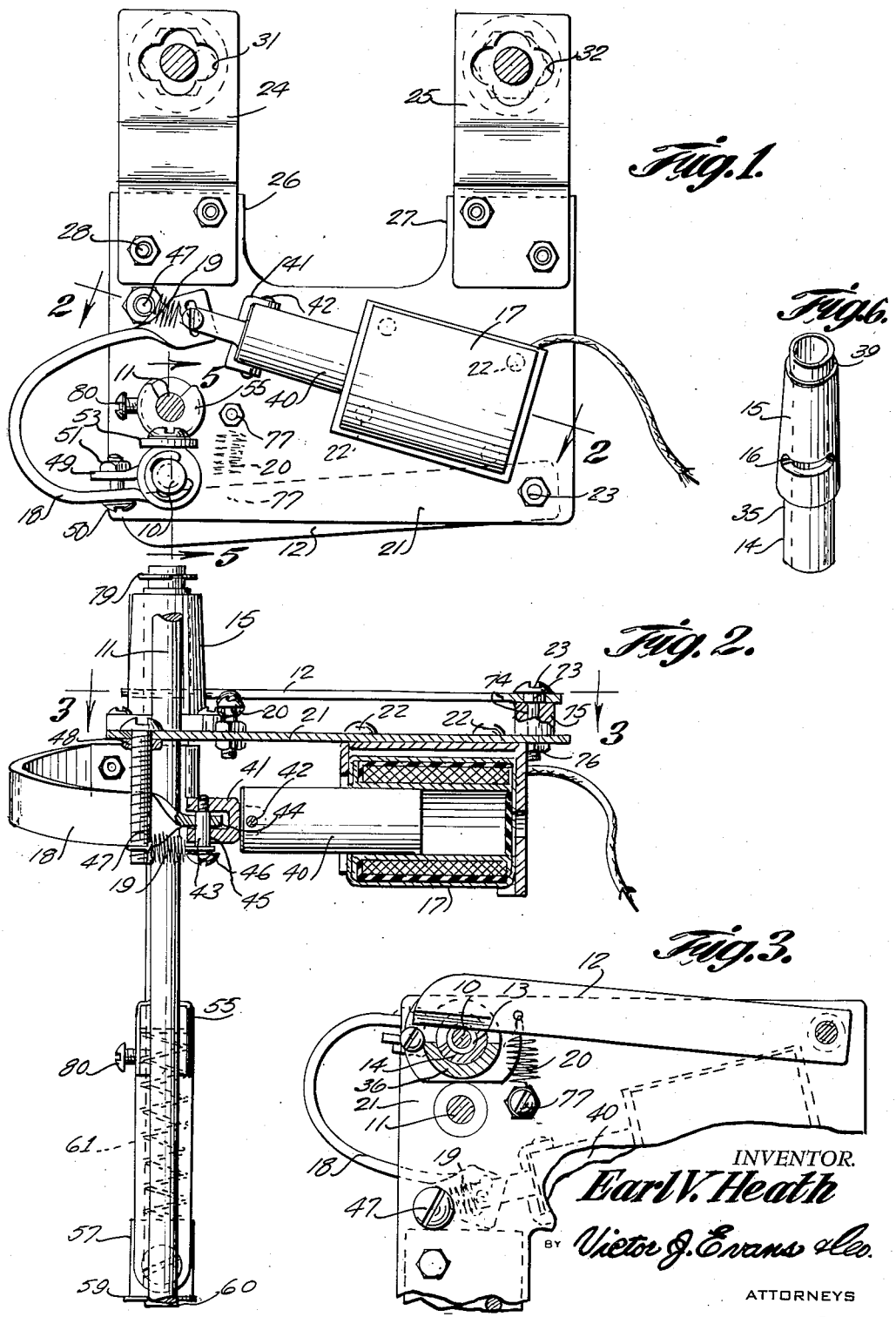

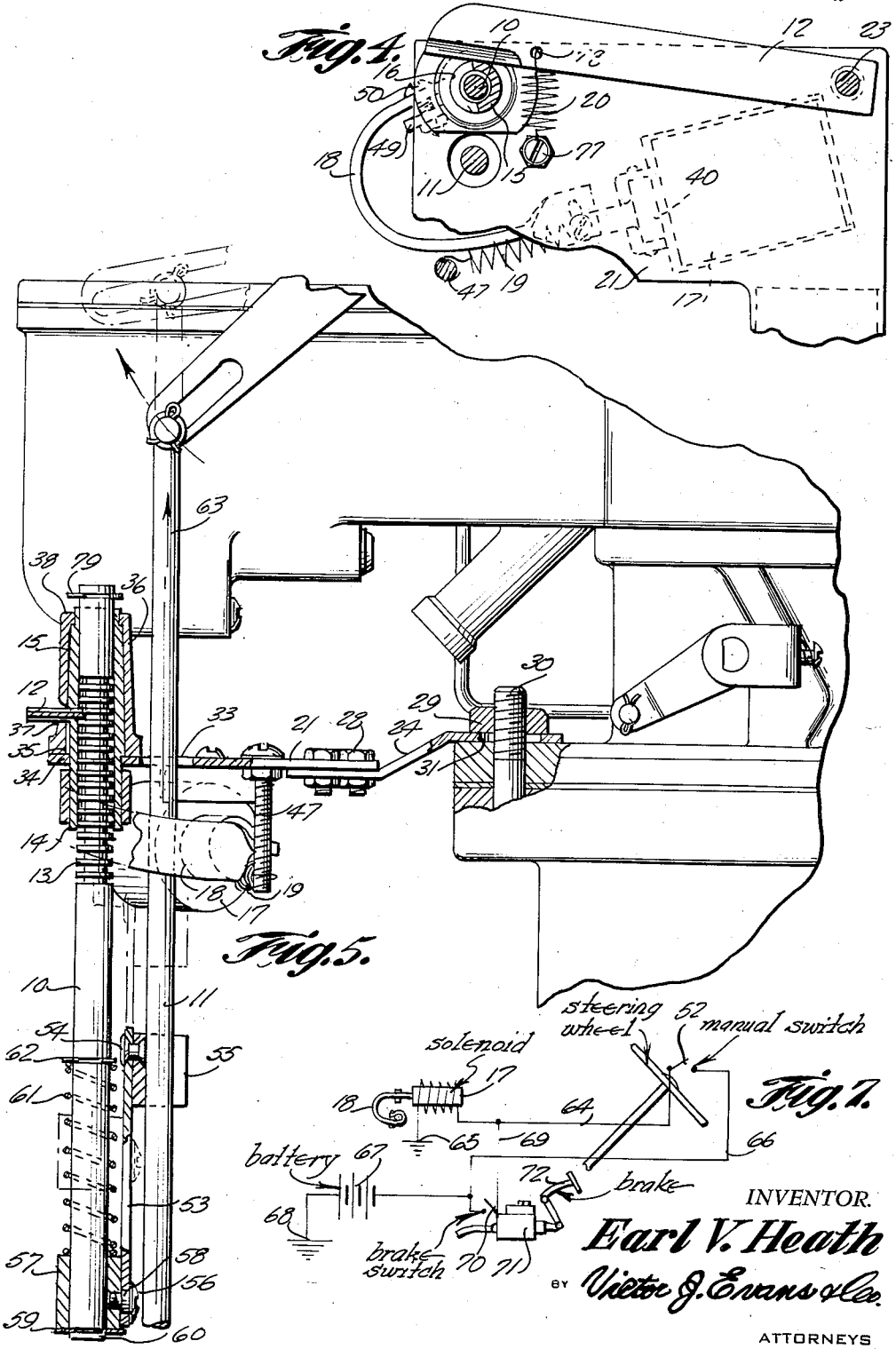

Earl V. Heath, Lake Placid, Fla.

Application June 15, 1956, Serial No. 591,574

3 Claims. (Cl. 192—3)

This invention relates to control devices particularly adapted for motor vehicles, and in particular a device adapted to be mounted in a motor vehicle between the accelerator pedal and carburetor wherein with the vehicle operating at a selected speed, such as 30 miles per hour, a button actuated blade snaps into one of a plurality of annular grooves whereby the vehicle continues at the selected speed and the foot may be positioned on the floor for rest, and wherein, the accelerator pedal may be used for passing or hill climbing after which, by removing the foot, the device returns to the selected position and the vehicle assumes the speed corresponding therewith.

The purpose of this invention is to provide temporary means for operating a vehicle at a constant speed and also to eliminate the necessity of endeavoring to watch the highway and speedometer at the same time.

Various types of speed control attachments have been used on motor vehicles and although such devices may be set to prevent exceeding predetermined speeds, it is difficult to change the positions of the devices when additional speed is required, such as in passing and in hill climbing. Also with conventional devices of this type it is difficult to arrange the control elements whereby after accelerating the speed to pass a vehicle or climb a hill, the parts return to the position for operating the vehicle at the selected speed. With this thought in mind this invention contemplates a speed control device that operates automatically with the operation of the foot or accelerator pedal whereby the vehicle may be operated in the usual manner and when it is desired to drive the vehicle over an extended area in which the highway is substantially level, or through a city, or the like, the vehicle is actuated until the desired speed is reached and at this time upon pressing a button the control device is set whereby the butterfly valve of the carburetor remains in this position, and wherein by placing the foot on the accelerator pedal additional speed may be provided if desired, or by actuating the holding device with the same button the vehicle may be operated at a relatively low speed.

The object of this invention is, therefore to provide a speed control device that is adapted to be set by a button adjacent the steering wheel of a vehicle.

Another object of the invention is to provide a speed control device that permits resting the feet while driving.

Another important object of the invention is to provide an automatic speed control device in which the butterfly valve of the carburetor is returned to the idling position with the application of the foot brake pedal.

It is yet another object of the invention to provide a device for setting the control of a motor vehicle engine whereby the battery may be charged without retaining the foot on the accelerator pedal while a vehicle is parked.

A further object of the invention is to provide means for stepping up the idling speed of an engine for warming up an engine before driving.

A still further object of the invention is to provide means for retaining an engine of a motor vehicle at a selected speed to prevent the vehicle rolling backward in starting a vehicle on a hill after the vehicle has been brought to a complete stop.

And a still further object of the invention is to provide a speed control device that permits operation of an engine in the conventional manner and that also makes it possible to operate a vehicle at a predetermined speed in which the device is of a simple and economical construction.

With these and other objects and advantages in view the invention embodies an auxiliary rod adjacent a conventional carburetor control rod and a solenoid actuated blade positioned to extend into annular grooves in the auxiliary rod whereby with the solenoid actuated by a button adjacent the steering wheel of a vehicle the blade may be withdrawn from a groove of the auxiliary rod or inserted in a different groove to change the speed, as may be desired.

Other features and advantages of the invention will appear from the following description taken in connection with the drawings, wherein:

Figure 1 is a view looking upwardly toward the under side of a bracket for mounting the speed control device in a motor vehicle.

Figure 2 is a side elevational view of the speed control device with the solenoid and adjacent parts thereof shown in section, said section being taken on line 2—2 of Fig. 1.

Figure 3 is a sectional plan taken on line 3—3 of Fig. 2 also showing the blade of the control device.

Figure 4 is a view similar to that shown in Fig. 3 showing the device with the holding blade in a released position.

Figure 5 is a vertical section taken on line 5—5 of Fig. 1 showing the conventional carburetor control rod and also the auxiliary control rod with the parts mounted by a bracket on a vehicle.

Figure 6 is a view showing a tapering sleeve with a slot in one side, the slot being positioned to receive the blade for holding the auxiliary rod in adjusted position.

Figure 7 is a diagrammatic view illustrating the relative positions of the parts.

Referring now to the drawings wherein like reference characters denote corresponding parts the improved speed control device of this invention includes an auxiliary rod 10 spaced from and positioned parallel to a conventional carburetor control or gas rod 11, between the foot throttle and carburetor, a blade 12 positioned to extend into annular grooves 13 of the auxiliary rod 10, a sleeve 14 having an upper portion with a tapering outer surface 15 and also having a slot 16 therein, a solenoid 17, connected by a lever 18 to the sleeve 14, a spring 19 for drawing the core of the solenoid outwardly, a spring 20 for urging the blade 12 through the slot 16 and into one of the grooves 13 of the auxiliary rod 10, and a mounting plate 21 from which the solenoid is suspended by screws 22 and to which the blade 12 is pivotally connected with a bolt 23.

The mounting plate 21 is suspended by brackets 24 and 25 that are secured to extensions 26 and 27 with bolts 28 and, as shown in Fig. 1 the brackets 24 and 25 are secured to a part of the vehicle such as the dash board, floor boards or the like with nuts 29 which are threaded on studs 30, the studs extending through enlarged openings 31 and 32 in the brackets to facilitate adjusting the position of the mounting plate.

The conventional carburetor actuating rod 11 extends through an opening 33 in the mounting plate and the auxiliary rod 10, which is positioned in the sleeve 14 extends through a similar opening 34, a shoulder 35 on the sleeve 14 resting upon the upper surface of the mounting plate. The upper tapering portion 15 of the sleeve 14 is enclosed with an outer thimble 36, which is also provided with a slot 37 that is in registering relation with the slot 16 and that is formed with a flange 38 at the upper end that rests upon a shoulder 39 of the portion 15 of the sleeve.

The solenoid, which is suspended from the mounting plate 21 by the screws 22, is provided with a core 40, on the end of which is a bracket 41 that is secured to the core with a pin 42 and the bracket is pivotally connected by a bolt 43 to a twisted end 44 of the lever 18, as shown in Fig. 2 wherein the bolt 43, is threaded in one arm of the bracket and extended through an opening 45 in the opposite arm. It will also be noted that the end loop 46 of the spring 19 is positioned around the bolt 43 and the opposite end is secured to a screw 47 that is secured in the mounting plate with a lock nut 48. The extended end of the lever 18 is bent around the section 14 of the sleeve with the extended end of the lever 18 providing a flange 49 and the flange 49 is drawn toward the body of the lever with a bolt 50 having a nut 51 thereon whereby the device provides a clamp securing the end of the lever 18 to the sleeve 14. By this means the sleeve is rotated as the core 40 of the solenoid is drawn into the solenoid and upon rotation of the sleeve 14 from the position shown in Fig. 3 to that shown in Fig. 4 the blade is forced outwardly from the slot 16 whereby the blade rides on the outer surface of the sleeve and is withdrawn from one of the annular grooves 13 of the auxiliary rod. Drawing the blade from the groove of the auxiliary rod releases the auxiliary rod permitting the rod to return to the position of rest.

Upon operation of the accelerator pedal by the foot of the operator of the vehicle the auxiliary rod travels with the rod 11 and when the vehicle reaches a predetermined speed a button, providing a switch 52, adjacent the steering wheel of the vehicle is pressed whereby the core of the solenoid is pulled inwardly turning the sleeve 15 and pushing the blade out of one of the grooves 13, and upon releasing the button the spring 19 turns the sleeve 15 back and the spring 20 draws the blade into one of the grooves 13, the blade passing through the slots 37 and 16.

The auxiliary rod 10 is connected to the conventional rod 11 with an arm 53, one end of which is pivotally mounted by a stud 54 on a collar 55 on the rod 11 and the opposite end is connected by a screw 56 to a collar 57 that is slidably mounted on the auxiliary rod 10. The screw 56 is provided with a cylindrical shank 58 to facilitate turning of the arm 53 and the lower end of the rod 10 is provided with a stop 59 including a washer which is retained in position by an offset head 60 on the lower end of the rod. The collar 57 is urged downwardly by a spring 61, the upper end of which is retained in position by a collar 62 secured to the auxiliary rod 10. These elements providing a yielding connection whereby with the rod 10 held by the blade 12 pressure upon the accelerator pedal of a vehicle, which moves the rod 11 upwardly in the direction of the arrow 63, in Fig. 5 draws the collar 57 compressing the spring 61 whereby the butterfly valve is opened to admit additional fuel to the engine with the auxiliary rod 10 remaining stationary.

The bolt or pin 23 upon which the blade 12 is pivotally mounted is provided with a shoulder 73, and the shank of the bolt is clamped in an opening 74 in a boss 75 on the mounting plate 21, with a lock nut 76.

The spring 20 for urging the blade 12 through the slots 37 and 16 and into the annular grooves 13 of the auxiliary rod 10 is mounted, at one end, on a stud 77 extended from the mounting plate, and at the opposite end in an opening 78 in the blade.

The upper end of the auxiliary rod 10 is provided with a collar or washer 79 to limit downward movement thereof, and the split collar 55 on the lower portion of the carburetor control rod 11 by a set screw 80.

Operation

With the parts assembled and installed on a motor vehicle as illustrated and described the vehicle is operated in the conventional manner with the speed controlled by the accelerator pedal and when it is desired to hold speed constant for a relatively long period of time the button 52 is actuated to close a circuit to the solenoid and in drawing the core of the solenoid inwardly the sleeve 14 is rotated, moving the blade 12 away from the annular grooves of the auxiliary rod and upon release of the button wherein the circuit is broken the spring 19 draws the core of the solenoid outwardly, rotating the sleeve 14 to the position shown in Fig. 3 wherein the spring 20 draws the blade through the slots 37 and 16 and into one of the annular grooves. With the auxiliary rod retained in position by the blade 12 the butterfly valve of the carburetor is retained in position by the spring 61 and link or arm 53 whereby the vehicle continues to travel at a constant speed.

However, should it be desired to increase the speed of the vehicle for passing another vehicle or for hill climbing, or in an emergency it is only necessary to press the accelerator pedal whereby the rod 11 moves upwardly toward the collar 57 without disturbing the position of the auxiliary rod 10, and after this operation, such as passing a vehicle the accelerator pedal is released and the spring 61 draws the collar 57 and control rod 11 downwardly whereby the vehicle continues to travel at the selected speed.

It will be understood that the connecting elements illustrated in the drawings are only typical and with different types of vehicle engines and carburetors it will be necessary to attach the mounting plate and other elements by other mounting devices.

It is also noted in Fig. 7 that the elements may be connected to the switch 52 with different types of circuits, however, in the typical circuit illustrated in Fig. 7 one terminal of the switch 52 is connected by a wire 64 to the solenoid 17, the opposite terminal of which is connected to a ground 65. The opposite terminal of the switch 52 is connected by a wire 66 to one side of a battery 67, the opposite side of which is connected to a ground 68. The device is also provided with a bypass or auxiliary circuit wherein the wire 64 is connected by a wire 69 to one terminal of a switch 70 on a master cylinder 71 of the foot brake 72 and the other terminal of the switch 70 is connected by a wire 73 to the wire 66 extending to the battery 67. With this connection in the circuit the device is adapted to be actuated by pressing the foot pedal 72, which closes the circuit to the solenoid, or by pressing a button closing the switch 52. The device, is therefore, adapted to be actuated by a hand, or by the foot of an operator, of a vehicle in which the device is installed.

It will be understood that modifications, within the scope of the appended claims, may be made in the design and arrangement of the parts without departing from the spirit of the invention.

What is claimed is:

1. In a speed control device, the combination which comprises a carburetor control rod, an auxiliary rod having spaced annular grooves in the outer surface, a sleeve having a slot therein positioned with the slot in registering relation with at least one of the grooves of the auxiliary rod, a collar slidably mounted on the auxiliary rod, resilient means on the auxiliary rod for retaining the collar in position upon the rod, a collar fixedly mounted on the carburetor control rod, a link pivotally connecting the collar of the auxiliary rod to the collar of the carburetor control rod, a solenoid having a core, a blade pivotally mounted adjacent the auxiliary rod and positioned to extend into the grooves of the auxiliary rod, resilient means for urging the blade into the grooves of the auxiliary rod, a lever connected to the core of the solenoid at one end and positioned with the opposite end secured to means for withdrawing the blade from the grooves of the auxiliary rod, and resilient means for actuating the sleeve to permit the blade to be drawn into one of the annular grooves of the auxiliary rod.

2. In a speed control, the combination which comprises a carburetor control rod, a mounting plate adapted to be mounted on a motor vehicle, an auxiliary rod having spaced annular grooves therein adjacent the carburetor control rod, a sleeve having a slot therein positioned with the slot in registering relation with at least one of the grooves of the auxiliary rod, a blade pivotally mounted on the mounting plate and positioned to extend through the slot of the sleeve and into one of the annular grooves of the auxiliary rod, a spring connected to the blade and mounting plate for urging the blade toward the auxiliary rod, a solenoid, a lever secured by a clamp to the sleeve at one end and connected to a core of the solenoid at the opposite end, a spring for drawing the core of the solenoid outwardly from the solenoid, a circuit connecting the solenoid to a source of current supply, said circuit having one switch therein positioned adjacent the steering wheel of the vehicle upon which the device is installed and another switch adapted to be actuated by the foot brake of the vehicle and a flexible connection between the auxiliary rod and the carburetor control rod.

3. In a speed control, the combination which comprises a carburetor control rod, a mounting plate adapted to be mounted on a motor vehicle, an auxiliary rod having spaced annular grooves therein spaced from the carburetor control rod and positioned parallel thereto, a sleeve having a slot therein positioned with the sleeve in registering relation with at least one of the grooves of the auxiliary rod, a blade pivotally mounted on the mounting plate and positioned to extend through the slot of the sleeve and into one of the annular grooves of the auxiliary rod, a spring connected to the blade and mounting plate for urging the blade toward the auxiliary rod, a solenoid, a lever secured by a clamp to the sleeve at one end and connected to a core of the solenoid at the opposite end, a spring for drawing the core of the solenoid outwardly from the solenoid, a circuit connecting the solenoid to a source of current supply, said circuit having a switch therein positioned adjacent the steering wheel of the vehicle upon which the device is installed, a flexible connection between the auxiliary rod and the careburetor control rod, and a cross connection between the solenoid and battery whereby the solenoid is energized upon application of the foot brake.

References Cited in the file of this patent

UNITED STATES PATENTS

| | | |
|---|---|---|
| 2,033,821 | Ellery | Mar. 10, 1936 |
| 2,509,358 | Krieg | May 30, 1950 |
| 2,742,123 | Exline | Apr. 17, 1956 |
| 2,768,535 | Brown | Oct. 30, 1956 |